(12) United States Patent
Wilburn et al.

(10) Patent No.: US 11,838,495 B1
(45) Date of Patent: Dec. 5, 2023

(54) ELECTRONIC DEVICES WITH VISION CORRECTING DISPLAYS

(71) Applicant: Apple Inc., Cupertino, CA (US)

(72) Inventors: Bennett S. Wilburn, Saratoga, CA (US); Eric J. Hansotte, Morgan Hill, CA (US); Fu-Chung Huang, Cupertino, CA (US); Jonathan C. Moisant-Thompson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 16/993,168

(22) Filed: Aug. 13, 2020

Related U.S. Application Data

(60) Provisional application No. 62/900,284, filed on Sep. 13, 2019.

(51) Int. Cl.
| | |
|---|---|
| *H04N 13/366* | (2018.01) |
| *G02B 30/20* | (2020.01) |
| *F21V 8/00* | (2006.01) |
| *A44C 5/00* | (2006.01) |
| *G04G 17/08* | (2006.01) |
| *H04N 9/31* | (2006.01) |
| *H04N 13/111* | (2018.01) |
| *G03H 1/26* | (2006.01) |

(52) U.S. Cl.
CPC ......... *H04N 13/366* (2018.05); *A44C 5/0007* (2013.01); *G02B 6/003* (2013.01); *G02B 6/0035* (2013.01); *G02B 30/20* (2020.01); *G03H 1/268* (2013.01); *G04G 17/08* (2013.01); *H04N 9/312* (2013.01); *H04N 13/111* (2018.05)

(58) Field of Classification Search
CPC .... H04N 13/366; H04N 13/111; G02B 30/20; G02B 6/003; G02B 6/0035; A44C 5/0007
USPC .......................................................... 348/40
See application file for complete search history.

(56) References Cited

U.S. PATENT DOCUMENTS

| | | |
|---|---|---|
| 9,558,590 B2 | 1/2017 | Westerinen et al. |
| 10,319,154 B1 | 6/2019 | Chakravarthula et al. |
| (Continued) | | |

FOREIGN PATENT DOCUMENTS

| | | | | |
|---|---|---|---|---|
| CN | 201000553 | * | 1/2008 | ............... G03C 3/00 |

OTHER PUBLICATIONS

CN201000553 Machine Translation (Year: 2008).*

(Continued)

*Primary Examiner* — Nguyen T Truong
(74) *Attorney, Agent, or Firm* — Treyz Law Group, P.C.; G. Victor Treyz; Tianyi He

(57) ABSTRACT

An electronic device may provide visual content at a virtual image distance that is farther from a user than the physical distance of the device from the user. A display in the device may have a transmissive spatial light modulator and beam steering device that are illuminated by a plane wave illumination system to provide computer-generated hologram images, may have a waveguide-based system that ensures that image content is presented at a desired virtual image distance, or may be a light-field display. The display may be used to display a left image in a left eye box and a right image in a right eye box. When viewed from the eye boxes, the left and right images fuse and are visible at a virtual image distance that is farther from the user than the distance physically separating the eye boxes from the display.

28 Claims, 6 Drawing Sheets

(56) References Cited

U.S. PATENT DOCUMENTS

2006/0092375 A1    5/2006   Menezes et al.
2019/0166359 A1*  5/2019   Lapstun ............... H04N 13/307
2019/0227331 A1*  7/2019   Roessel ............. G02B 27/0172
2021/0149197 A1*  5/2021   Yadin ..................... G02B 26/06

OTHER PUBLICATIONS

Fu-Chung Huang et al., Eyeglasses-free Display: Towards Correcting Visual Aberrations with Computational Light Field Displays, ACM Transactions on Graphics (TOG) 33.4 (2014).

* cited by examiner

US 11,838,495 B1

ELECTRONIC DEVICES WITH VISION CORRECTING DISPLAYS

This application claims the benefit of provisional patent application No. 62/900,284, filed Sep. 13, 2019, which is hereby incorporated by reference herein in its entirety.

FIELD

This relates generally to electronic devices, and, more particularly, to electronic devices with displays.

BACKGROUND

Electronic devices may have displays for displaying images for users. Most people become presbyopic with age. After age 50, a typical person will exhibit less than one diopter of accommodative range. People need clear distance vision to navigate the world and perform tasks such as driving, so refractive vision errors are corrected to make distant objects appear sharp. To view a close object such as the display on an electronic device, a user must use reading glasses (in the case of a person with naturally good distance vision, contacts, or laser surgery) or must use bifocals. This can make display viewing cumbersome.

SUMMARY

An electronic device may have a display that is configured to provide visual content at a virtual image distance that is farther from a user than the physical separation of the user from the electronic device. This allows a user with good distance vision to view in-focus content, even when the electronic device is held in close proximity to the user's eyes.

The electronic device may provide visual content with accommodative distance (focus depth) far from the user, but convergence distance (stereo depth) close to the viewer, or at the display surface. This allows a user with good distance to focus clearly on imagery that appears to be fixed to a nearby display surface.

Control circuitry in the electronic device may use the display of the electronic device to generate left and right images for respective left and right eye boxes. Fixed and/or adjustable structures such as holograms, electrically adjustable beam steerers, and/or other optical components can be configured to supply the left image to the left eye box and the right image to the right eye box so that, when viewed by a user with eyes located in the eye boxes, the left and right images fuse to form a fused image at a virtual image distance that is greater than the physical distance between the eye boxes and the display system (e.g., at virtual image distance of at least 1 m, at least 2 m, or other suitable distance). This helps a user with good distance vision but limited accommodative range to focus on the fused image.

The display may have a display device such as a transmissive spatial light modulator that is illuminated by a plane wave illumination system to provide computer-generated hologram images, a waveguide-based system with an output coupler that ensures that image content is presented at a desired virtual image distance, or a light-field display that presents a light field corresponding to an image at the desired virtual image distance.

DETAILED DESCRIPTION

An electronic device may have a display. The display may have pixels for creating an image. Using a computer-generated hologram display, waveguide display, or light-field display, the device may place an image at a large virtual image distance (e.g., at least 1 m, at least 2 m, etc.) from eye boxes where the user's eyes are located. This allows a user with good distance vision (whether natural or corrected with contacts, glasses, or laser surgery) to view the image without using a vision aid such as reading glasses, even if the user is presbyopic and has a limited range of accommodation.

Figure 1:
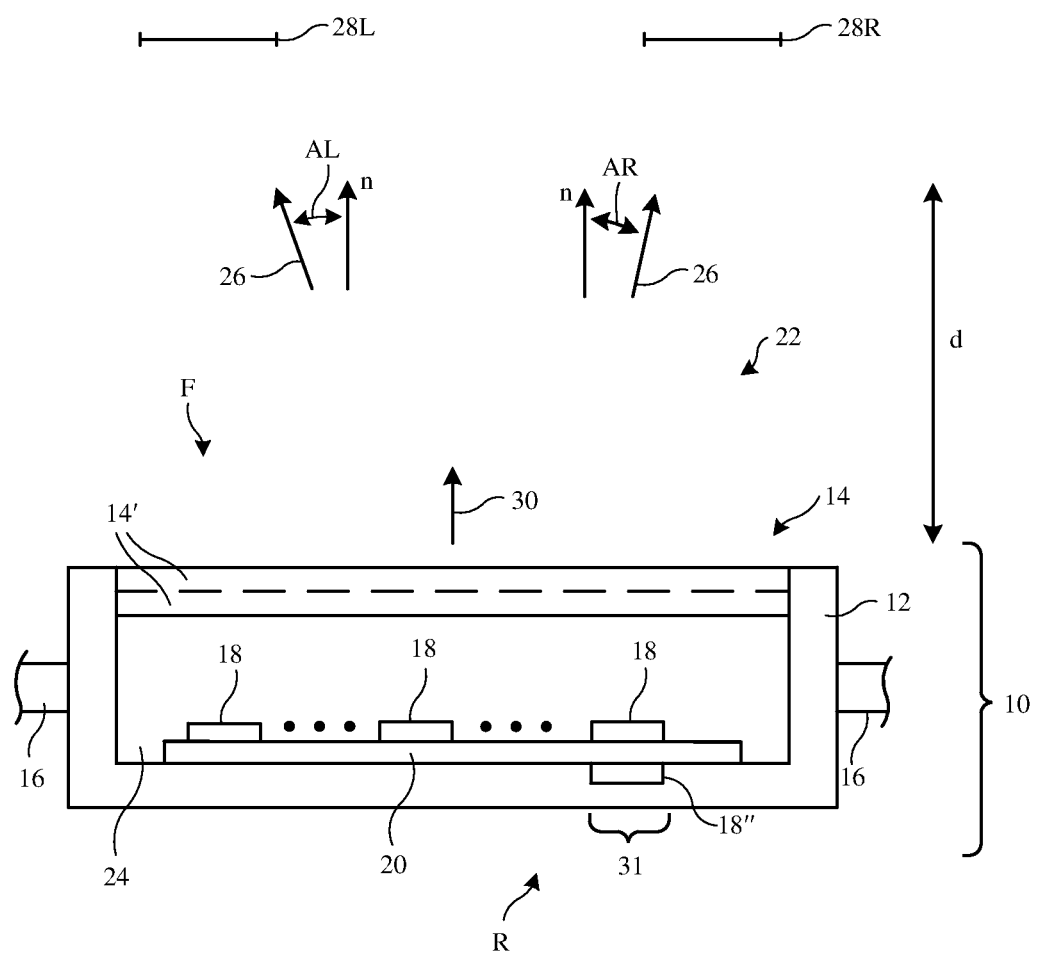
FIG. 1 is a cross-sectional side view an illustrative electronic device in accordance with an embodiment.

A cross-sectional side view of a portion of an illustrative electronic device is shown in FIG. 1. Device 10 may be a wrist device such as a wristwatch or other device with a wrist-worn housing configured to be worn on a user's wrist (e.g., a bracelet or wrist strap with an integrated display, etc.), a cellular telephone, a pendant device (e.g., a necklace with a display), other compact wearable devices, or other device with a display (e.g., a portable electronic device). As shown in FIG. 1, device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, device 10 may be a portable electronic device and may be configured to be worn on a user's body. For example, device 10 may be a wristwatch or other portable device with a band (see, e.g., optional strap 16). Strap 16, which may sometimes be referred to as a wrist strap, wrist band, wristwatch strap, or wristwatch band, may allow device 10 to be worn on a user's wrist (as an example).

Electrical components 18 may be mounted in interior region 24. Electrical components 18 may include integrated circuits, discrete components, light-emitting components, cameras (e.g., image sensors), touch sensors, motion sensors, optical sensors, and/or other sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22). For example, a transparent display cover layer may cover a display on front face F of device. In some configurations, housing 12 may have a transparent rear housing wall, transparent window structure, and/or other transparent structures on rear face R. For example, housing 12 may be transparent in region 31 overlapping electrical component

18″. Electrical component 18 may be, for example, a rear-facing camera and/or other optical component (as an example).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using displays and other light-emitting components such as light-emitting diodes (e.g., crystalline semiconductor light-emitting diodes for status indicators and/or displays, organic light-emitting diodes in displays and other components), lasers, and other light-emitting devices. Output may also be provide using audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. Display 14 may be supported by housing 12 on front face F of device 10 (as an example). Displays for device 10 such as display 14 may include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), a scanning mirror display, a liquid-crystal-on-silicon (LCOS) display, a one-dimensional or two-dimensional micromirror display, and/or other displays. Displays for device 10 may have pixel arrays or other image sources (e.g., a scanning mirror device) for displaying images for a user.

Display 14 may have multiple layers (e.g., two or more layers, three or more layers, etc.) as shown by layers 14' in FIG. 1. Inner display structures such as pixel array structures, illumination components, or other structures in layers 14' may be overlapped by additional optical elements (e.g., lenses, beam steering devices, spatial light modulators, adjustable polarizers, etc.). Display 14 may be a light-field display, a computer-generated hologram display, a waveguide display, or other display. During operation, the control circuitry of device 10 places virtual content at a desired focal distance from the user (e.g., images may be placed at a desired virtual image distance from a user's eyes located respectively at eye box 28L and eye box 28R).

Consider, as an example, a scenario in which a user has presbyopia and exhibits a limited accommodative range (e.g., a range of accommodation of about 1D or less). The user may have good distance vision by virtue of having good uncorrected distance vision or by virtue of wearing eyeglasses or contacts). Due to the limited range of accommodation for the user, the user may be unable to view both far objects and near objects. As a result, when the distance d between eye boxes 28L and 28R and the location of display 14 on device 10 is relatively small (e.g., less than 1 m, less than 60 cm, less than 40 cm, 10-60 cm, at least 10 cm, at least 15 cm, etc.), device 10 will appear out of focus to the user. To ensure that content on display 14 is in focus for the user without requiring that the user use reading glasses, the control circuitry of device 10 can use display 14 to output a virtual image at a virtual image distance that lies within the user's accommodative range. The image that is provided may be a computer-generated hologram image, an image that is output through a holographic lens or other structure in a waveguide device that places the image at the desired virtual image distance, or an image at the desired virtual image distance that corresponds to a light field synthesized with a light-field display. The control circuitry of device 10 may, in this example, display an image that appears at a virtual distance of at least 1 m, at least 2 m, at least 4 m, infinity, less than 100 m, less than 10 m, 1-10 m, 2-10 m, or other distance from eye boxes 28L and 28R that is larger than distance d. A user with a 1D of accommodative range and good distance vision (e.g., good vision at infinity) may be provided with image content at a virtual image distance of at least 1 m, a user with 0.5D of accommodative range and good distance vision may be provided with image content at a virtual distance of at least 2 m, etc. Because many older users with presbyopia may have only 1D of accommodative range, the control circuitry of device 10 may, in some embodiments, use display 14 to produce light output that corresponds to a virtual image at a distance of at least 1 m, which will be viewed as in focus for a user with good vision at infinity, even if the user is presbyopic and has less than less than 1D of accommodative range. In general, the output of the display may be used to satisfy any limited amount of accommodation (e.g., less than 2D, less than 1.5 D, less than 1D, less than 0.5 D, etc.).

The lateral dimensions of eye boxes 28L and 28R may be at least 1 mm, at least 5 mm, at least 1 cm, at least 2 cm, less than 10 cm, less than 5 cm, 2.5 cm, or other suitable amount. The lateral dimensions of eye boxes 28L and 28R may be sufficient to reliably cover a user's pupils, but small enough to ensure that each pupil lies within only one eye box. To ensure that displayed content is visible to both of the user's eyes, a first portion of image light 26 may be directed toward eye box 28L and a second portion of image light 26 may be directed toward eye box 28R. As an example, layers 14' may include a beam steerer that alternately directs image light to eye box 28L and eye box 28R (e.g., by alternating left and right images respectively to eye box 28L and eye box 28R at a rate of about 60 Hz, 120 Hz, at least 30 Hz, less than 480 Hz, or other suitable alternation rate). If desired, spatial multiplexing may be used in addition to or instead of using a beam steerer to alternate between left and right images (e.g., respective left and right red-green-blue computer-generated hologram images can be spatially multiplexed by a fixed hologram or other fixed beam steering component in the display so that the left image is statically directed to eye box 28L and the right image is statically directed to eye box 28R). Illustrative configurations in which control circuitry in device 10 uses a display 14 to alternately display a left computer-generated image in a left eye box and a right computer-generated image in a right eye box may sometimes be described herein as an example.

Particularly in configurations in which device 10 is a small portable device (e.g., a wristwatch), it can be challenging to generate an image of an item far from the user that is visible by both eyes of the user looking through the watch face (front face F of FIG. 1). Display 14 may use collimated light optics, a computer-generated hologram image arrangement, or a light-field display arrangement that ensures that image content is presented to the user at a desired virtual image distance (e.g., at least 1 m, at least 2 m, at infinity, or at other suitable virtual image distance) as the user is viewing the display of device 10 with eyes located in the eye boxes. At the same time, the user's eyes verge on device 10 (e.g., the user's eyes rotate inwardly to view display 14), which presents the user with a vergence-based depth cue indicating to the user that the virtual image is located close to the user (e.g., at or near device 10).

With one illustrative configuration, display 14 has a beam steerer that alternately displays a left computer-generated hologram image in left eye box 28L and a right computer-generated hologram image in right eye box 28R. This allows output light for each eye box to be spread across relatively small eye box dimensions while still providing coverage for both of the user's eyes.

The beam steerer may be a planar electrically switchable light steering device such as a liquid crystal polarization grating, a switchable Bragg grating, a static grating layer and switchable polarizer, or other electrically adjustable beam steering device and may be used to steer image content selectively to eye boxes 28R and 28L. A camera or other sensor in components 18 (e.g., a camera viewing eye boxes 28L and 28R in direction 30 of FIG. 1) may serve as a pupil tracking device that determines the location of the user's pupils and therefore desired locations for presenting images in eye boxes 28L and 28R. By gathering pupil tracking information in this way, the angles AL and AR of FIG. 1 may be determined. These angles correspond to the directions in which image light is steered by the beam steerer of display 14 or other optical component in display 14 relative to display surface normal n to reach the user's eyes in eye boxes 28L and 28R of FIG. 1, respectively.

Based on the known locations of the user's eyes, the control circuitry of device 10 uses display 14 to create left eye and right eye images (e.g., computer-generated hologram images) that fuse properly when the user verges at the distance of the watch display (e.g., when the user's pupils turn inwardly to view front face F). During these binocular image generation operations, the control circuitry of device 10 may create unique virtual objects for each of the user's eyes based on the known locations of the user's pupils. The left and right images may be configured so that they that project to identical images at front face F (e.g., the face of the wrist watch in this example). For each image, this involves perspective projection from the virtual object plane, with the eye pupil as the center of perspective). In this way, a fused image at a desired virtual image distance can be created from the left and right images.

Figure 2:
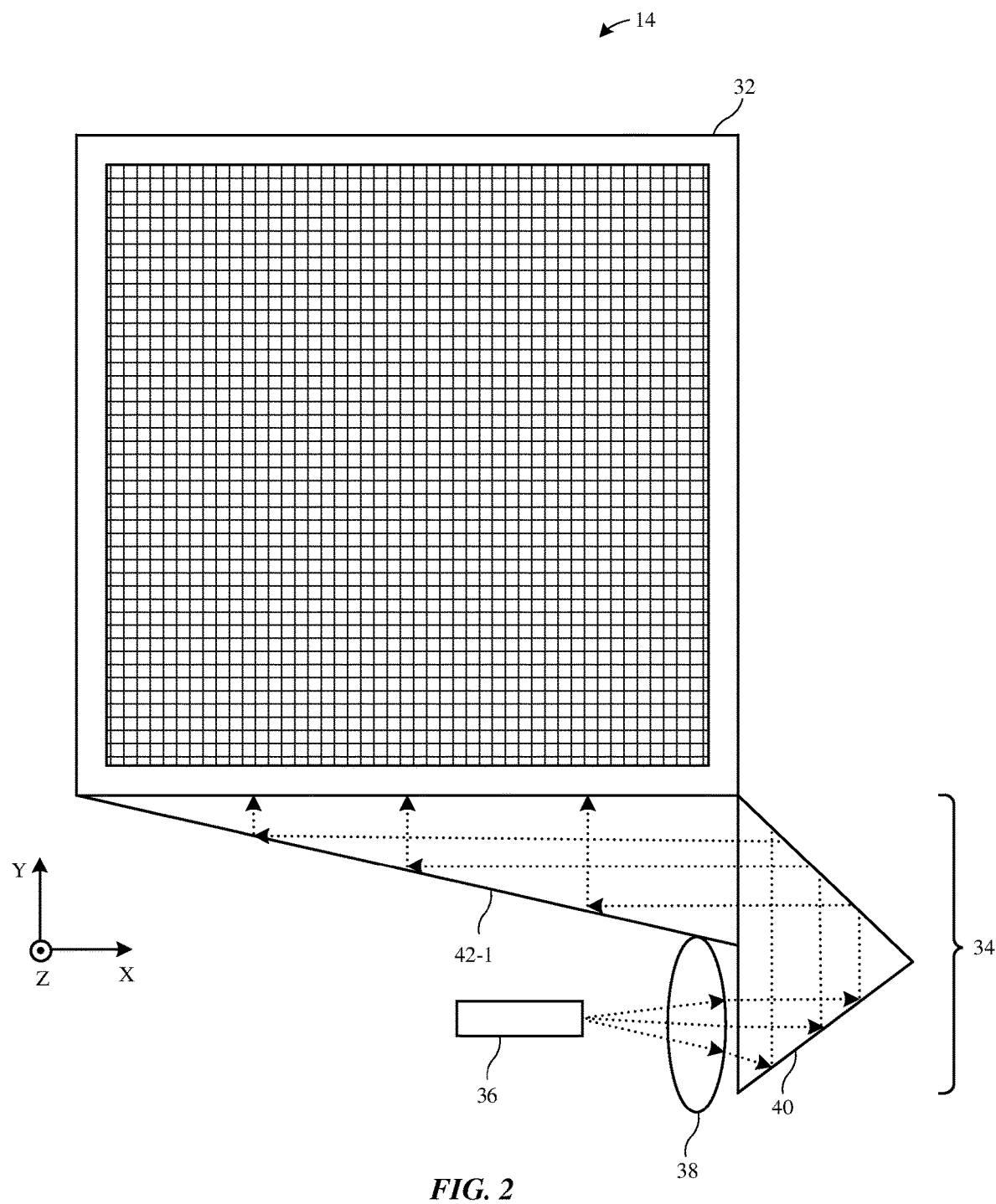
FIG. 2 is a top view of an illustrative electronic device display in accordance with an embodiment.

FIG. 2 is a top view of an illustrative configuration that may be used for display 14. In the example of FIG. 2, display 14 is a computer-generated hologram display. As shown in FIG. 2, display 14 includes a spatial light modulator such as transmissive spatial light modulator 32 having an array of individually-adjustable pixels. The control circuitry of device 10 can modulate the light transmission through each of the pixels of spatial light modulator 32 during operation. Spatial light modulator 32 may be illuminated by illumination system 34. System 34 may include light source 36 (e.g., a red, green, and blue laser system), collimating lens 38, prism 40, and first stage volume hologram 42-1. As shown in FIG. 2, first stage volume hologram 42-1 uses the illumination provided by light source 36 to output light rays in the Y direction that are spread out along the X direction.

Figure 3:
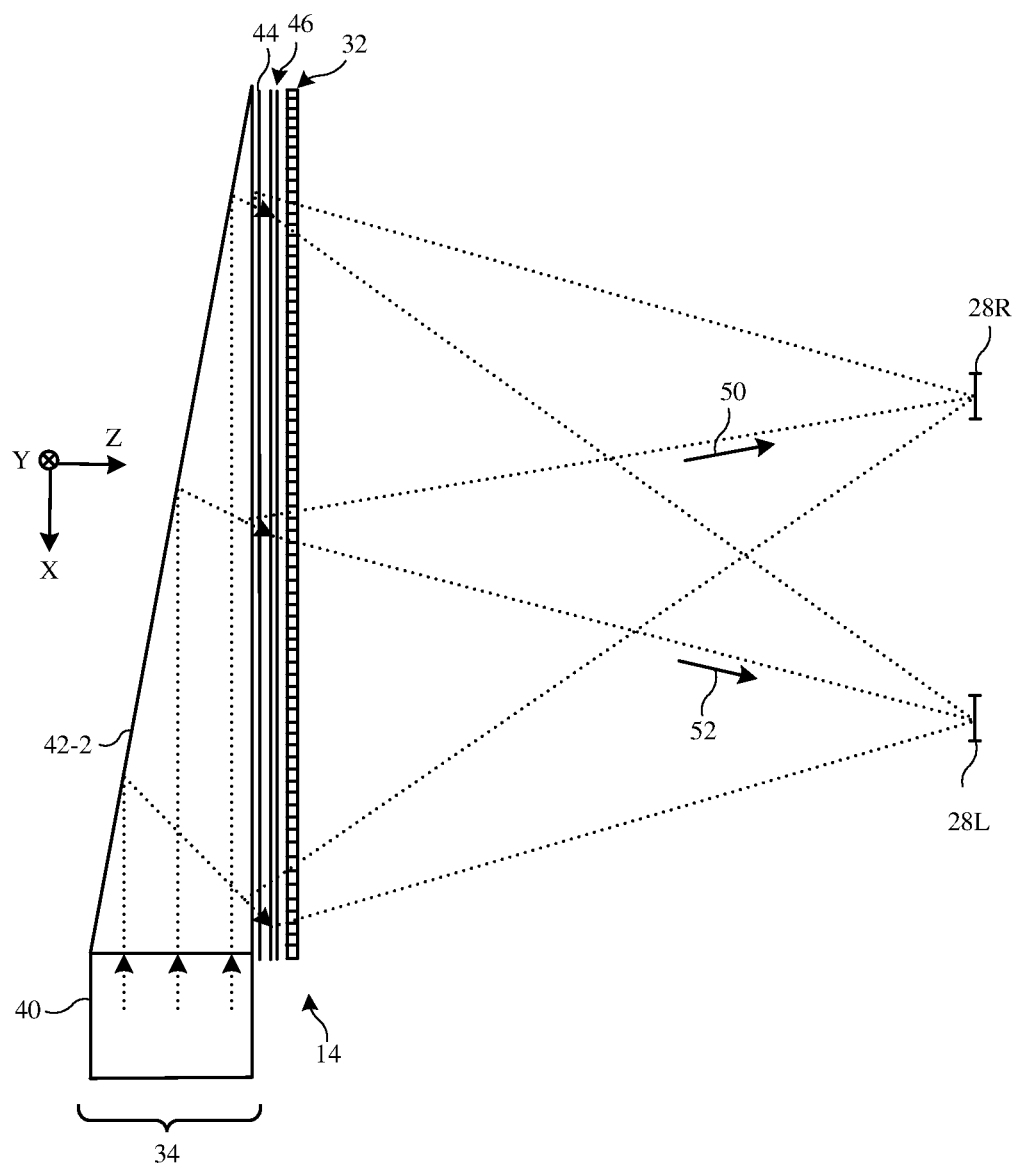
FIG. 3 is a cross-sectional side view of the illustrative electronic device display of FIG. 2 in accordance with an embodiment.

A side view of display 14 of FIG. 2 viewed along the Y axis is shown in FIG. 3. As shown in FIG. 3, illumination system 34 also includes second stage volume hologram 42-2, which receives the light rays from first stage volume hologram 42-1 that are traveling along the Y dimension and redirects this illumination as plane wave illumination propagating along the Z direction toward spatial light modulator 32. Volume holograms 42-1 and 42-2 may be formed from holographic structures written in photosensitive polymer material on a polymer plate and/or other holographic structures.

As shown in FIG. 3, display 14 may have a beam steering layer such as beam steerer 44 and a field lens such as field lens 46 interposed between illumination system 34 and spatial light modulator 32. Beam steerer 46 may be a liquid crystal polarization grating, a switchable Bragg grating, a static grating layer and switchable polarizer, or other electrically adjustable beam steering device. Field lens 46 may be a passive (fixed) lens such as a grating lens, achromatic geometric phase lens, or other lens layer that focuses plane wave light from system 34 to the user's eyes. During operation, the control circuitry of device 10 uses display 14 to create alternately a right eye computer-generated hologram image that travels along path 50 to right eye box 28R and a left eye computer-generated hologram image that travels along path 52 to left eye box 28L. The virtual image distance associated with these images may be at least 1 m, at least 2 m, or other suitable distance) from eye boxes 28R and 28L. As the user views the left and right images with the user's eyes in eye boxes 28R and 28L, the left and right images fuse to form a complete image (e.g., a fused virtual image at a distance of at least 2 m from the user). Because the virtual image distance of the fused image is relatively large, a user with presbyopia can view the image in focus, so long as the user has good distance vision. Although algorithms for computing real-time volumetric computer-generated holograms for three-dimensional scenes tend to be computationally intensive, presbyopia correction operations such as these can be performed by rendering a single plane at a focal depth of 1 m or beyond, or 2 m or beyond (as examples). These computations can be performed by the control circuitry of device 10 using a fast-Fourier transform (FFT) suitable for execution on a portable electronic device such as a wristwatch, cellular telephone, or other portable electronic device.

Figure 4:
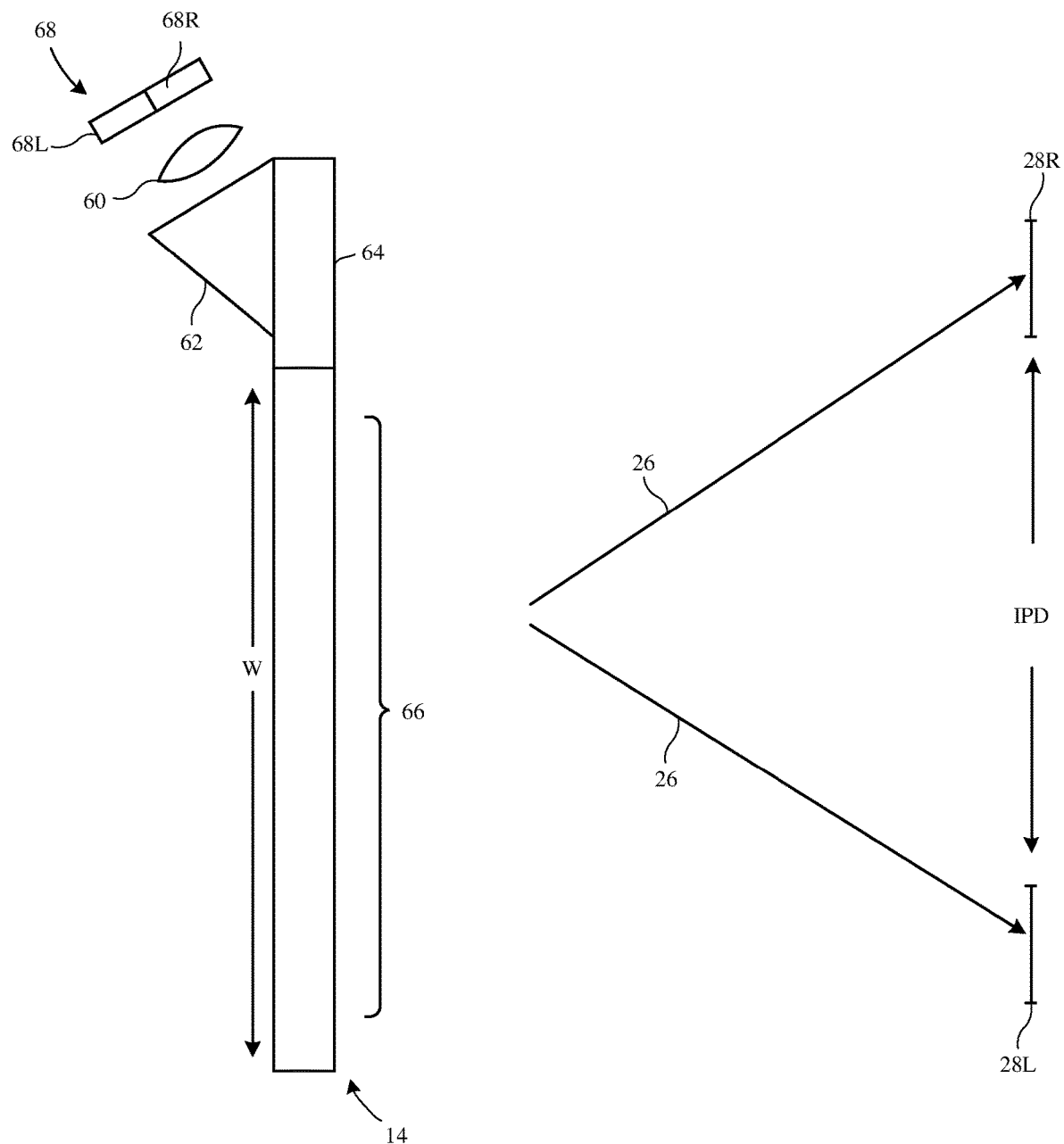
FIG. 4 is a cross-sectional side view of an illustrative waveguide display system in accordance with an embodiment.

FIG. 4 is a diagram of display 14 in an illustrative configuration in which display 14 has collimated waveguide optics. As shown in FIG. 4, display device 68 (e.g., a pixel array such as a digital mirror device two-dimensional pixel array, a liquid-crystal-on-silicon two-dimensional pixel array, a scanning mirror display device such as a scanning microelectromechanical systems device display device, etc.) may produce left image 68L and right image 68R. Lens 60 and a prism or other optical coupler may be used to couple the left and right images into planar waveguide 64 while collimating the output of display device 68. This ensures that the output of display 14 will be formed from plane waves (virtual images located at a virtual image distance of infinity). In region 66, display 14 has an output coupler that directs left image 68L to left eye box 28L and that directs right image 68R to right eye box 28R. The use of collimating optics in display 14 (e.g., a single-element or multi-element collimating lens such as lens 60) places image content at a desired virtual image distance (e.g., at infinity in this example), thereby allowing a user with good distance vision to view in-focus fused images.

A left virtual image is created in left eye box 28L by illuminating an appropriate set of pixels in device 68 based on the known location of the user's left eye. Collimating lens 60 ensures that the left virtual image that is output by display 14 will have a virtual image distance that is greater than the physical distance between the user and device 10 (e.g., a virtual image distance of infinity in this example). Similarly, a right virtual image is created in right eye box 28R by illuminating an appropriate set of pixels in device 68 based on the known location of the user's right eye. Collimating lens 60 ensures that the right virtual image that is output by display 14 will have a virtual image distance that is greater than the physical distance between the user and device 10 (e.g., a virtual image distance of infinity in this example). During operation, eye boxes 28R and 28L are generally located a distance d of about 10-60 cm (arm's length) from display 14. The interpupillary distance IPD separating eye boxes 28R and 28L from each other (and therefore separating the user's pupils from each other) is generally larger than the lateral dimension (e.g., width W) of display 14 (e.g., for the waveguide optics configuration of FIG. 4 and/or other configurations for device 10 such as the configuration of FIGS. 2 and 3). The use of beam steering allows a user with an IPD that is greater than the width W of display 14 (e.g., the largest lateral dimension of the output coupler) to view a satisfactory fused image. If desired, a user can view display 14 up close (e.g., by placing a single eye within a few cm or other distance of display 14). In this type of operation, device 10 is effectively being used in a "monocular" mode. A user may manually switch between monocular and binocular operating modes and/or the control circuitry of device 10 may use a proximity sensor, gaze tracking system, front-facing camera, and/or other sensors to measure distance d (and/or IPD and/or other usage attributes) and automatically switch between monocular and binocular output modes in response to these measurements.

In an illustrative configuration, device 10 (e.g., device 10 of FIG. 4 or other devices 10) can use a rear-facing camera (see, e.g., optical component 18" of FIG. 1) to capture real-world images while simultaneously displaying these images for a user with display 14. In scenarios in which device 10 is a wearable device such as a pendant device, the user may hold the pendant device in a position that aims the rear-facing camera at real-world objects of interest. In scenarios in which device 10 is a wristwatch, the wristwatch may be removed from the user's wrist to unblock the rear-facing camera and/or the camera can be configured to view real-world objects sideways (e.g., viewing through a transparent sidewall portion of housing 12 that is not blocked by the user's wrist).

The user may view a fused image of such real-world image content using binocular viewing arrangements (with left and right eyes located respectively in left and right eye boxes) and/or may view real-world image content in a virtual image that is presented to a single eye using a monocular viewing arrangement. The captured content may or may not be digitally processed (e.g., to exhibit magnification or wide angle effects). By displaying real-world images in this way, a user with good distance vision can view close-up objects in real time. The close-up objects will be in focus for the user when the user views these images on display 14.

The output coupler in region 66 may be formed using any suitable output coupler technology. For example, the output coupler may be a hologram such as a volume hologram, louver-type mirrors, surface relief gratings, Bragg gratings, etc. If desired, one or more optical layers containing one or more suitable optical components may be stacked with the output coupler in region 66. Such optional optical layers may include, for example, a lens layer to place the virtual image distance of the fused virtual image from display 14 at a distance closer than infinity (e.g., a distance greater than the physical distance of device 10 from the user such as at least 1 m, at least 2 m, etc.), an electrically adjustable beam steerer, and/or other optical devices.

In an illustrative configuration, the output coupler used by the display system of FIG. 4 is a static output coupler that uses spatial multiplexing, polarization multiplexing, and/or wavelength multiplexing, to statically steer the right and left images. Display device 68 may include switchable components (e.g., an adjustable polarizer, an adjustable wavelength light source, a spatially adjustable source, etc.) that operate in conjunction with static multiplexing structures in waveguide 64 and the output coupler of waveguide 64. If desired, the output coupler and/or other structures associated with the display device and/or waveguide 64 may include adjustable components (e.g., a planar electrically switchable light steering device such as a liquid crystal polarization grating, a switchable Bragg grating, a static grating layer and switchable polarizer, or other electrically adjustable beam steering device) to dynamically steer a left image to left eye box 28L and a right image to the right eye box 28R. The left and right images may be presented to the user at a focal distance of at least 2 m (as an example), thereby allowing a user with good distance vision to view a fused virtual image that is in focus.

Figure 5:
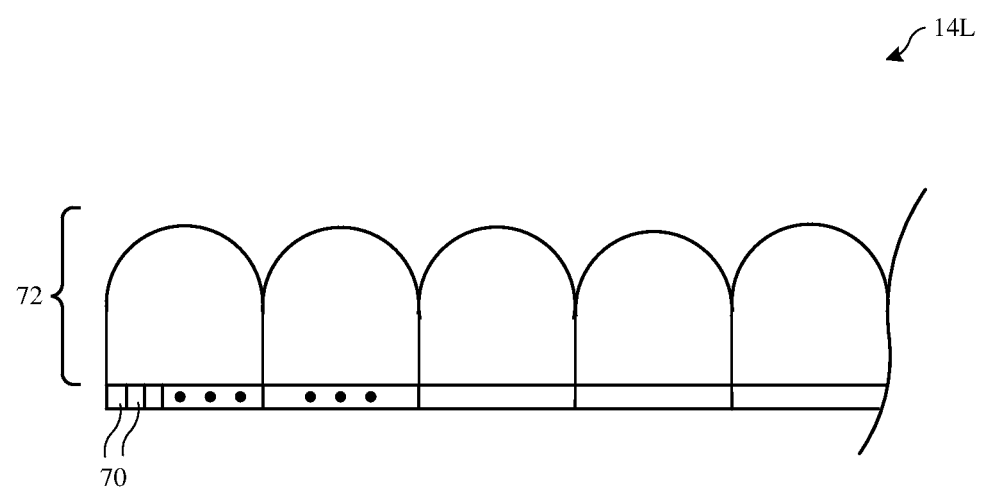
FIG. 5 is a cross-sectional side view of an illustrative light field display in accordance with an embodiment.

Waveguide 64 may be formed from a planar substrate (e.g., waveguide may be a planar waveguide formed from a plate of transparent material such as clear polymer, glass, etc.). An output coupler may couple the left and right images out of waveguide 64 towards eye boxes 28L and 28R, respectively. This system uses a collimated optics approach in which virtual content is generated with a focus distance of at infinity. If desired, display 14 may be based on a light-field display device such as light-field display device 14L of FIG. 5. Light-field display device 14L has a pixel array covered with an array of microlenses 72 or other lenses or may use other light-field display structures (e.g., stacked display layers, microlouvers, etc.). In the illustrative microlens light-field display of FIG. 5, each lens 72 overlaps multiple pixels 70 (e.g., at least 50, at least 100, at least 400, fewer than 10,000, fewer than 1000, fewer than 500, etc.). Control circuitry in device 10 can activate a pattern of pixels 70 under lenses 72 that creates a light field corresponding to virtual images in the range of accommodation for the user (e.g., at a focal distance of at least 1 m, at least 2 m, or other suitable virtual image distance suitable for viewing in-focus content by viewers with good distance vision). The control circuitry can use display 14L to alternately produce left and right images for left and right eye boxes or a beam steerer and/or other optical components in display 14 can be used to steer left and right images to left and right eye boxes.

Figure 6:
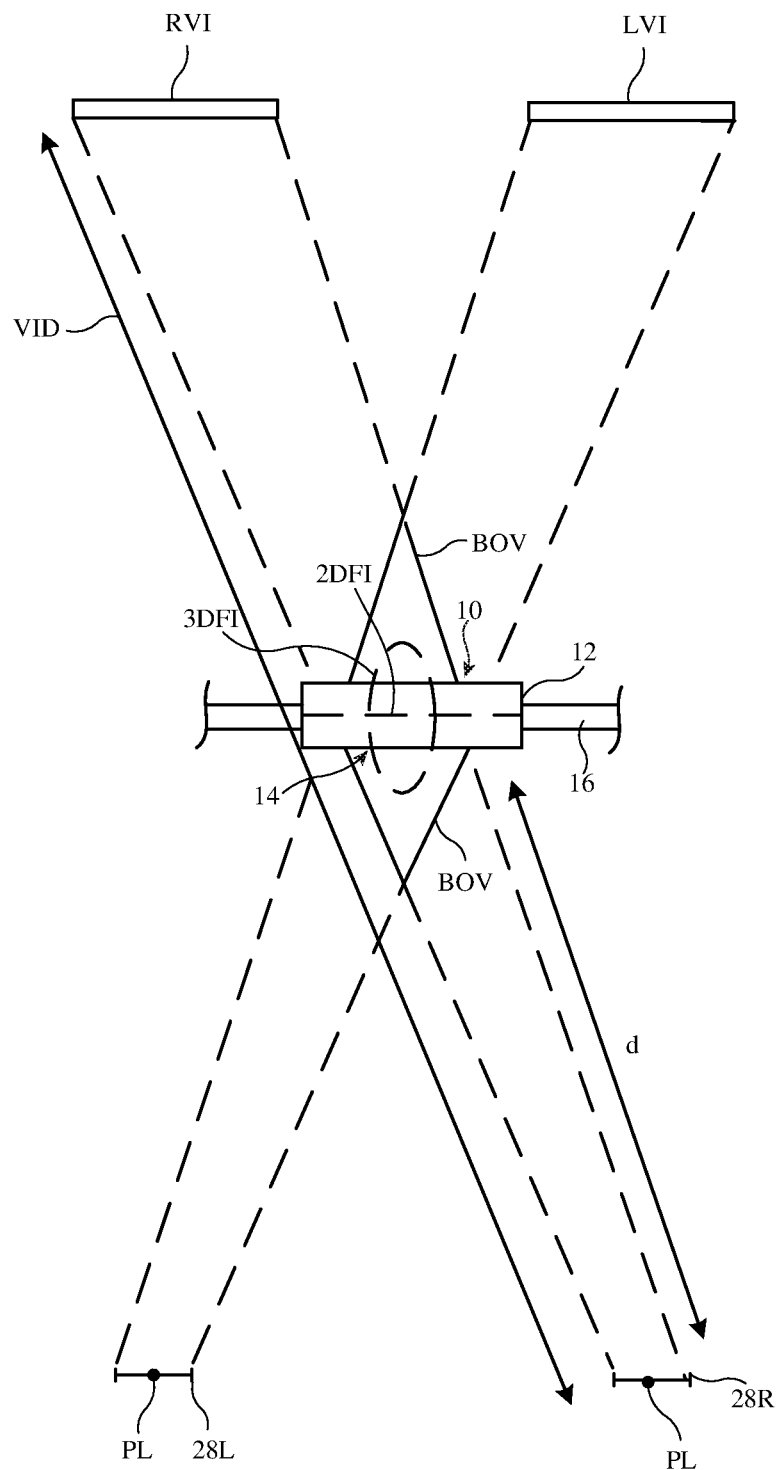
FIG. 6 is a diagram showing how left and right virtual images may fuse to form a fused image in a binocular overlap region in accordance with an embodiment.

FIG. 6 is a top view of device 10 showing how a user with pupils PL in eye boxes 28L and 28R may view a fused image created by display 14 of device 10.

Initially, an eye tracking system (e.g., a camera facing the user's face or other gaze tracking system in device 10 that determines user pupil location) determines the locations of the user's pupils PL. This pupil location information is used by device 10 to adjust the output of display 14 to ensure that a left image is formed in left eye box 28L and is aligned with the user's left pupil and that a right image is formed in right eye box 28R and is aligned with the user's right pupil.

In a waveguide-based display, for example, the control circuitry of device 10 may illuminate left and right subregions of the pixels in display device 68 to ensure that respective left and right virtual images are provided in corresponding left and right eye boxes that coincide with the measured locations of the user's left and right eyes. The pixel subregions that are used in forming the left and right images each involve use of fewer than all of the pixels in display device 68 (e.g. a subset of the pixels in a two-dimensional pixel array such as a liquid-crystal-on-silicon pixel array, a subset of the pixels in a two-dimensional pixel array such as a two-dimensional digital mirror device pixel array, etc.). By tracking the user's pupils and generating eye-box-sized left and right images, device 10 only renders into sub-regions of a larger field of view. Accordingly, when device 10 uses display 14 to only light up those subregions, bandwidth is reduced, power consumption is reduced, etc.

Device 10 is physically located a physical distance d away from eye boxes 28L and 28R. In configurations in which device 10 is a wrist watch, for example, distance d corresponds to an arm's length (e.g., about 20-60 cm). As the user fixes their view on display 14, the user's eyes simultaneously rotate inwardly (verge) onto display 14 and device 10. This provides the user with a vergence depth cue indicating that device 10 and display 14 are located at physical distance d. This vergence depth cue will tend to override any conflicting accommodation depth cues that user receives due to the fact that their eyes are focused on more distant virtual images. As a result, the user will generally perceive that the images presented by display 14 are located at distance d from the user.

As the user views display 14, a fused image is created in binocular overlap region BOV (e.g., a binocular overlap volume created by the user's overlapping right-eye and left-eye fields of view from eye boxes 28R and 28L, respectively). The fused image may have any suitable shape within region BOV. For example, display 14 may create a two-dimensional fused image such as two-dimensional image 2DFI (e.g., two-dimensional text, etc.) or a three-dimensional fused image such as three-dimensional image 3DFI.

The fused image in region BOV is created by the fusing of two virtual images: left virtual image LVI and right virtual image RVI. Left virtual image LVI is viewed by the user's eye in left eye box 28L and right virtual image RVI is viewed by the user's eye in right eye box 28L. These virtual images are located at a virtual image distance VID from the eye boxes that is greater than physical distance d. A presbyopic user with good distance vision (e.g., an ability to view objects clearly at infinity) and 1D of accommodative range can focus clearly on virtual images in a range of virtual image distances from infinity down to 1 m. Accordingly, it may be desirable to set virtual image distance VID to a value between infinity and 1 m or a value between infinity and 2 m for computer-generated hologram displays. In waveguide-based displays, the collimating lens in the display creates plane wave output from region 66, so virtual image distance VID is infinity (e.g., in the absence of any stacked lenses in region 66). Waveguide-display fused images therefore can also be readily viewed by presbyopic users with good distance vision (e.g., an accommodative range of 1D corresponding to a range of focus distances from infinity to 1 m).

To create a satisfactory fused image for viewing by the user, device 10 measures the locations of the user's eyes (e.g., pupils PL of FIG. 4). This allows device 10 to determine how much perspective correction to apply to the virtual images. For example, pupil location information can be used by the control circuitry of device 10 to determine the amount of keystoning to use in generating the left and right virtual images to correct for the effects of the off-axis perspectives of the user's right and left eyes when verging onto device 10. Because the user's eyes are verging onto display 14 at physical distance d, the fused image will appear to be located at or near to device 10 (e.g., within binocular overlap region BOV). When creating visual output for the user, the control circuitry of device 10 uses information on the locations of the user's pupils (and therefore the locations where eye boxes 28L and 28R are to be located) to create a satisfactory stereo pair of images (left virtual image LVI and right virtual image RVI) that fuse properly in region BOV (e.g., with proper alignment to create a desired fused image). In computing the left virtual image LVI and the right virtual image RVI to produce a desired two-dimensional or there-dimensional fused image in region BOV, device 10 performs a perspective projection for each eye from the known left and right pupil locations through the physical shape of display 14 (e.g., onto a plane parallel to the surface of display 14).

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A wristwatch, comprising:
a wristwatch housing;
a wrist strap coupled to the wristwatch housing;
a waveguide that is supported by the wristwatch housing and that has an output coupler;
a display device supported by the wristwatch housing for providing visual content to left and right eye boxes, wherein the left and right eye boxes are separated from the wristwatch housing by a physical distance; and
control circuitry configured to use the display device to display a left virtual image in the left eye box and a right virtual image in the right eye box that fuse to form a fused image at a virtual image distance from the left and right eye boxes that is greater than the physical distance.

2. The wristwatch defined in claim 1 further comprising a sensor configured to gather pupil location information to determine locations for the left and right eye boxes.

3. The wristwatch defined in claim 2 wherein the sensor comprises a camera configured to gather the pupil location information and wherein the control circuitry is configured to use the display device to display the left virtual image in the left eye box and the right virtual image in the right eye box using the pupil location information.

4. The wristwatch defined in claim 3 wherein the display device comprises a pixel array.

5. The wristwatch defined in claim 4 wherein the pixel array comprises a pixel array selected from the group consisting of: a liquid-crystal-on-silicon pixel array and a two-dimensional digital mirror device pixel array.

6. The wristwatch defined in claim 3 wherein the display device comprises a scanning mirror device.

7. The wristwatch defined in claim 1 wherein the virtual image distance is infinity.

8. The wristwatch defined in claim 1 further comprising a collimating lens, wherein the collimating lens is configured to pass light from the display device to the waveguide.

9. The wristwatch defined in claim 8 wherein the output coupler comprises an output coupler selected from the group consisting of: a holographic output coupler, a Bragg grating output coupler, a surface relief grating output coupler, and a microlouver mirror output coupler.

10. The wristwatch defined in claim 1 wherein the waveguide comprises a planar waveguide formed from a transparent plate.

11. An electronic device, comprising:
a housing;
a display system coupled to the housing; and
control circuitry configured to use the display system to provide a left virtual image to a left eye box and a right virtual image to a right eye box, wherein the left and right eye boxes are separated from the housing by a physical distance, wherein the left and right virtual images are configured to fuse when viewed from the left and right eye boxes to form a fused image at a virtual image distance from the left and right eye boxes that is greater than the physical distance, wherein the display system comprises a beam steerer, and wherein the control circuitry is configured to use the beam steerer to steer the left virtual image to the left eye box and to steer the right virtual image to the right eye box.

12. The electronic device defined in claim 11 wherein the virtual image distance is at least 1 m.

13. The electronic device defined in claim 11 wherein the beam steerer is configured to alternate between steering the left virtual image to the left eye box and the right virtual image to the right eye box.

14. The electronic device defined in claim 13 further comprising a camera configured to gather pupil tracking information, wherein the control circuitry is configured to control the beam steerer at least partly based on the pupil tracking information.

15. The electronic device defined in claim 14 wherein the beam steerer comprises a planar electrically switchable light steering device selected from the group consisting of: 1) a liquid crystal polarization grating, 2) a switchable Bragg grating, and 3) a static grating layer and switchable polarizer.

16. A wristwatch, comprising:
a wristwatch housing;
a wrist strap coupled to the wristwatch housing;
a display supported by the wristwatch housing for providing visual content to left and right eye boxes; and
control circuitry configured to use the display to display a left computer-generated hologram image in the left eye box and a right computer-generated hologram image in the right eye box that fuse when viewed from the left and right eye boxes into a single fused image at a virtual image distance of at least 1 m, wherein the display comprises a spatial light modulator and wherein the control circuitry is configured to use the display to alternately display the left computer-generated hologram image in the left eye box and the right computer-generated hologram image in the right eye box.

17. The wristwatch defined in claim 16 wherein the spatial light modulator comprises a transmissive spatial light modulator.

18. The wristwatch defined in claim 17 wherein the display comprises an illumination system configured to illuminate the transmissive spatial light modulator with plane wave illumination.

19. The wristwatch defined in claim 18 wherein the illumination system comprises a light source and a holographic structure.

20. The wristwatch defined in claim 19 wherein the holographic structure comprises a planar holographic structure that is configured to receive light from the light source and provides the plane wave illumination as corresponding output.

21. The wristwatch defined in claim 20 wherein the display comprises a beam steerer.

22. The wristwatch defied in claim 21 wherein the control circuitry is configured to use the beam steerer to alternately display the left computer-generated hologram image in the left eye box and the right computer-generated hologram image in the right eye box.

23. The wristwatch defined in claim 21 wherein the display comprises a field lens interposed between the spatial light modulator and the beam steerer.

24. The wristwatch defined in claim 21 wherein the beam steerer comprises a planar electrically switchable light steering device selected from the group consisting of: 1) a liquid crystal polarization grating, 2) a switchable Bragg grating, and 3) a static grating layer and switchable polarizer.

25. A portable electronic device, comprising:
a housing;
a display system comprising:
a waveguide that is supported by the housing and that has an output coupler, and
a display device supported by the housing for providing visual content to left and right eye boxes, wherein the left and right eye boxes are separated from each other by an interpupillary distance; and
control circuitry configured to use the display device to display a left virtual image in the left eye box and a right virtual image in the right eye box that fuse to form a fused image at a virtual image distance from the left and right eye boxes that is greater than the physical distance, wherein the output coupler has a maximum lateral dimension that is less than the interpupillary distance.

26. The portable electronic device defined in claim 25 further comprising a camera configured to capture real-world image content, wherein the control circuitry is configured to display the real-world image content in the fused image using the display system.

27. A wrist device, comprising:
a wrist-worn housing;
a display system comprising:
a waveguide that is supported by the wrist-worn housing and that is separated from an eye box by a physical distance, and
a display device supported by the wrist-worn housing; and
control circuitry configured to use the display system to provide a virtual image for viewing from the eye box, wherein the virtual image is provided with a virtual image distance from the eye box that is greater than the physical distance.

28. The wristwatch defined in claim 1 wherein the wristwatch housing comprises a display cover layer through which the left virtual image is presented to the left eye box and through which the right virtual image is presented to the right eye box.

* * * * *